United States Patent [19]

Meier

[11] 4,080,689

[45] Mar. 28, 1978

[54] REUSABLE CONNECTABLE STRAP SEGMENT WITHIN A LARGER STRAP SEGMENT

[75] Inventor: William A. Meier, Hoffman Estates, Ill.

[73] Assignee: Signode Corporation, Glenview, Ill.

[21] Appl. No.: 689,075

[22] Filed: May 24, 1976

[51] Int. Cl.² ............................................. B65D 63/02
[52] U.S. Cl. ............................ 24/20 EE; 24/23 EE
[58] Field of Search ............ 24/23 EE, 20 EE, 20 R, 24/20 CW, 20 TT, 20 W, 23 R

[56] References Cited

U.S. PATENT DOCUMENTS

| 389,933 | 9/1888 | Mansfield | 24/20 EE |
|---|---|---|---|
| 1,173,998 | 2/1916 | Depew | 24/23 W |
| 1,737,779 | 12/1929 | Stanbrough | 24/23 EE |
| 3,177,538 | 4/1965 | Timmerbeil | 24/20 EE |
| 3,235,924 | 2/1966 | Timmerbeil | 24/20 EE |

Primary Examiner—George H. Krizmanich
Attorney, Agent, or Firm—Dressler, Goldsmith, Clement, Gordon & Shore, Ltd.

[57] ABSTRACT

A metal strap segment adapted for forming a first loop about material to be tied and for forming a sealless strap connection between overlapping strap ends of the segment is provided with an integral smaller strap segment adapted for forming a second smaller loop and for forming a sealless strap connection between overlapping strap ends of the smaller segment when the smaller segment is severed from the larger segment. The severed ends of the remaining portion of the larger strap segment are also adapted for being reconnectable and forming a sealless strap connection therebetween.

11 Claims, 17 Drawing Figures

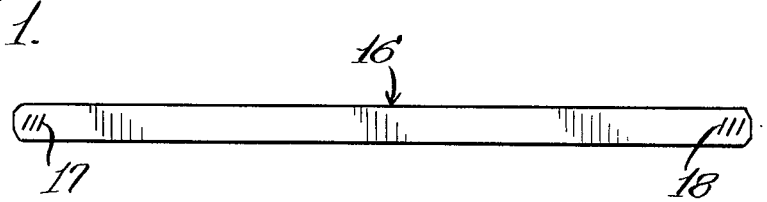
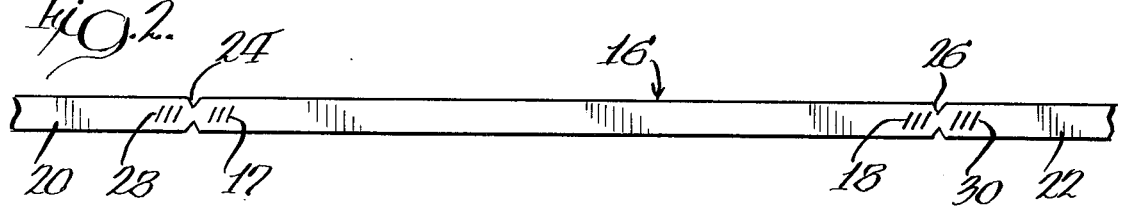
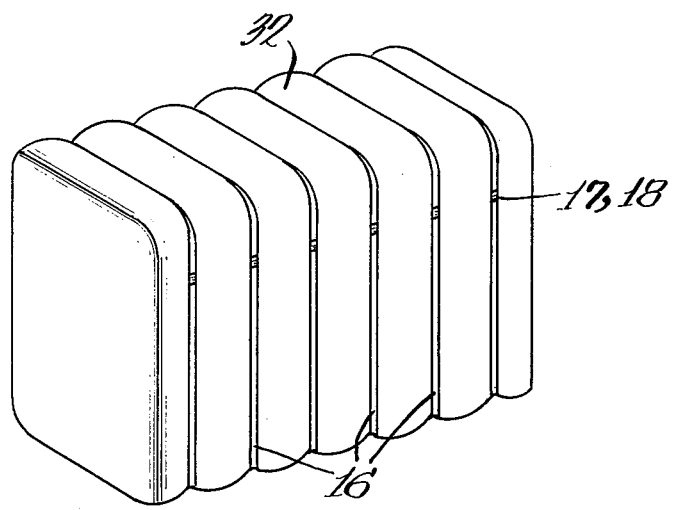
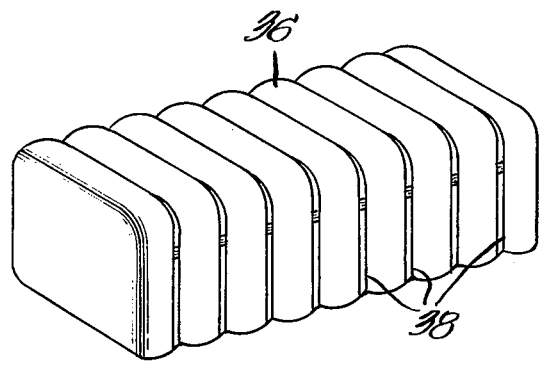

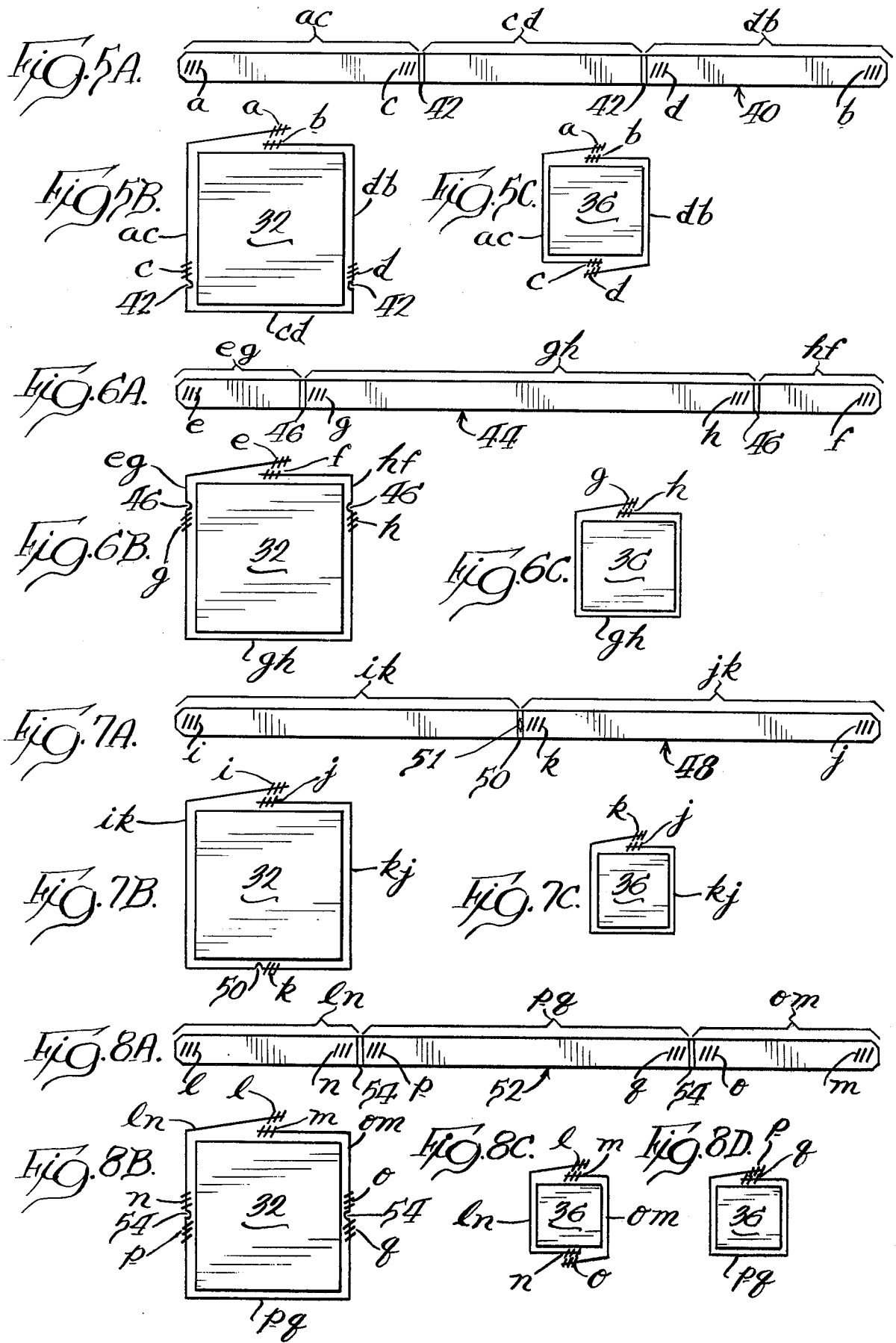

REUSABLE CONNECTABLE STRAP SEGMENT WITHIN A LARGER STRAP SEGMENT

BACKGROUND OF THE INVENTION

This invention relates to strap segments adapted for forming a loop about material to be tied and for forming a sealless strap connection between overlapping strap ends of a segment. The strap is made of relatively stiff sheet material, i.e., metal strap, and the like.

It is known to provide sealless connections between strap ends in the form of an array of longitudinally spaced joints. A common form of such a joint utilizes a central tongue provided with lateral wing extension partly along the opposite edges of the tongue. Representative prior art patents of this form of joint in this particular field of art are U.S. Pat. No. 180,910 to Olmsted, U.S. Pat. No. 1,606,331 to Anderson, U.S. Pat. Nos. 2,268,339 and 2,276,988 to Leslie, U.S. Pat. No. 3,137,047 to Mosey, U.S. Pat. No. 3,177,538 to Timmerbeil, and U.S. Pat. No. 3,188,706 to Partridge.

A form of a sealless strap connection wherein a relatively higher strength at the connection is realized and lateral pull-out action is avoided, or minimized, is taught in the U.S. Pat. No. 3,303,541 to Beach.

Another form of a sealless strap connection utilizes opposed shoulders displaced from the respective planes of the overlapped lengths of strap which are shaped to interlock with each other and an integral abutment means comprising juxtaposed protuberances shaped to irreversibly override each other while the opposed shoulders are moved into an interlocking position and presenting opposed stops when the shoulders interlock with each other. Such a joint is shown in the patent to Larry J. Simmons, U.S. Pat. No. 3,935,616.

In use, a strap segment is looped around a material or a package to be tied and the sealless connection is made. Depending on the type of sealless connection, the strap can be removed from the package or material by disengaging the connected overlapped ends or by severing the strap at some point. In those cases where the sealless strap segment must be severed, the segment cannot be reused without new joint elements being formed on its ends. In those cases where the strap segment ends can be disengaged from each other without damaging the joint elements, the strap segment can be reused, but only for a package, or a material of the same size as the first package or material.

Extensive use of metal strap segments is made in various industries where compressible material must be strapped or banded into bales, i.e., a bale of cotton, or the like. In such industries, it is sometimes the case that the material is baled, in one location, to a certain low density and then shipped to another location for further compression and forming into bales of higher density and smaller physical size. In those situations, the original strap segments are too large to be reused on the denser but smaller bale. New, smaller straps have to be used to tie the smaller bales.

SUMMARY OF THE INVENTION

The present invention contemplates a primary strap segment with the usual joint elements on each end, but with additional joint elements located on the segment and particularly spaced between the end joint elements. The additional joint elements are adapted to form the sealless strap connection with one or more of the other additional elements and/or with one of the joint elements on the end of the primary strap segment. By proper positioning and spacing of the additional joint elements, a smaller strap segment can be created from the middle portion of the larger primary strap segment by severing the primary strap segment in two places. The smaller strap segment can then be looped around a smaller package or a material to be tied and a sealless strap connection can be made between the ends of the smaller strap segment.

Alternatively, in those cases where the sealless connection is of the type to permit disengagement, the sealless connection of the primary strap segment ends can be disengaged and the primary strap segment can be severed in just one place. This severance will create two smaller segments. One or both of the segments could be reused on smaller packages or smaller bales.

In some cases it may be desirable to shorten the primary strap segment and reuse it to band a smaller package or bale with its original segment ends remaining connected. To accomplish this, it is necessary to move, by severance, a middle portion of the primary strap segment. With appropriately positioned additional joint elements, the severed ends of the primary strap segment can then be connected around the smaller package or bale.

Numerous other advantages and features of the invention will become readily apparent from the following detailed description of the invention and of one embodiment thereof, from the claims and from the accompanying drawings in which each and every detail is fully and completely disclosed as part of this specification.

BRIEF DESCRIPTION OF THE DRAWINGS

In the accompanying drawings which illustrate embodiments of the present invention, FIG. 1 is a plan view of a strap segment with an array of longitudinally spaced shear lock joint elements on each end;

FIG. 2 is a plan view of the strap segment shown in FIG. 1 before being severed from a continuous strip of strapping metal from which it is made;

FIG. 3 is a perspective view of a large low-density bale of material with six strap segments banded about it;

FIG. 4 is a perspective view of the bale shown in FIG. 3 compressed to a much higher density, and therefore smaller physical size, and with eight smaller strap segments banded about it;

FIGS. 5A, 6A, 7A, and 8A are plan views of strap segments with arrays of longitudinally spaced shear lock elements spaced in various positions on the segments;

FIGS. 5B, 6B, 7B, and 8B are end elevation views of a large low-density bale with the strap segment of the corresponding FIGS. 5A, 6A, 7A, and 8A loosely looped about in position for connecting the ends of the segments;

FIGS. 5C, 6C, 7C, and 8C are end elevational views of the bales of FIGS. 5B, 6B, 7B, and 8B compressed to a higher density, and therefore physically smaller shape, and with one or more severed portions of the strap segment of the corresponding FIGS. 5A, 6A, 7A, and 8A loosely looped about the bales and positioned for connecting the ends of the portions of the segment; and FIG. 8D is an end elevational view of another high-density smaller bale with a severed portion of the primary strap segment of FIG. 8A loosely looped about it in position for connecting the ends of the portion of the segment.

DESCRIPTION OF THE PREFERRED EMBODIMENTS

While this invention is susceptible of embodiments in many different forms, there is shown in the drawings and will herein be described in detail one specific embodiment, with the understanding that the present disclosure is to be considered as an exemplification of the principles of the invention and is not limited to the embodiment illustrated. The scope of the invention will be pointed out in the claims.

A primary strap segment 16 is shown in FIG. 1. On the left end of the strap segment is an outer array 17 of longitudinally spaced shear lock joint elements. On the right hand of the primary strap segment 16 is an outer array 18 of longitudinally spaced shear lock joint elements adapted to interlock with the outer array 17 when the ends of the primary strap segment 16 are overlapped.

The outer arrays 17 and 18 can be of any suitable type adaptable for forming a sealless strap connection between overlapped ends of a strapping element. A preferred type of array is that disclosed in the aforementioned U.S. Pat. No. 3,935,616 to Simmons. Attention is directed to the drawings and specification of that application for a complete description of the longitudinally oriented spaced staggered slits defining and being flanked by complementary integral web portions offset in opposite normal directions to present lengthwise opposed shoulders which interlock with opposed shoulders of an overlapping strap segment end.

In FIG. 1, and indeed in all the other figures showing a strap segment, the array of longitudinally spaced shear lock joint elements is symbolized by a group of three diagonal marks. The actual construction and number of interlocking shear lock joint elements in an array can vary with the particular design of the particular type of sealless strap connection being employed.

In FIG. 2, the strap segment 16 of FIG. 1 is shown as an integral part of a continuous strip of strap metal as it would be formed in a manufacturing process wherein the strap segments are fabricated in an end-to-end fashion from a continuous strip of metal. Strap segment 16 is shown connected to strap segment 20 on the left end and strap segment 22 on the right end. When strap segment 20 is to be used, it can be severed from the continuous strip of strap segments at notch 24 by any suitable means such as cutting or bending. Similarly, strap segment 16 can be severed from strap segment 22 at notch 26. Strap segment 20 has an array of joint elements, designated 28, on its right end. Strap segment 22 has an array of joint elements, designated 30, on its left end.

Strap segment 16 can be used to tie or band a bale of compressible material such as cotton. The strap segment 16 is looped about a bale of compressible material, while the material is under compression, and connected at its ends by means of the joint element arrays 17 and 18. In FIG. 3, a large bale 32 is shown with strap segment 16 looped and sealed around it. A total of six such strap segments are shown banded around large bale 32.

In certain industries, such as in the cotton production and processing industry, larger bales are first made at one location and then transported to a second location where they are compressed to a higher density and physically smaller size. The large bale 32 of FIG. 3 is shown in FIG. 4 as a compressed small bale 36 of higher density and smaller physical size. After compression to the smaller physical size, the small bale 36 is banded with smaller strap segments 38. Owing to the higher compression of the small bale 36, more reaction force must be overcome by the banding strap segments. Consequently, more strap segments are usually banded about the small bale 36 than the lower density, less compressed, large bale 32. In FIG. 4, eight smaller strap segments 38 are shown banded about the small bale 36.

In accordance with this invention, a strap combination segment is provided with additional arrays of joint elements. In FIG. 5A, a primary strap segment 40 coextensive with the combination strap segment is shown in plan view with the usual outer array of joint elements on each end, outer array "a" on the left end and outer array "b" on the right end. In addition, two other interior arrays of joint element arrays "c" and "d" are positioned on primary strap segment 40 between the outer arrays "a" and "b" and define the ends of, but are not included in, a disposable strap segment "cd." Arrays "a" and "b" are constructed to interlock with each other and arrays "c" and "d" are constructed to interlock with each other. In use, the primary strap segment 40 is looped about large bale 32, as shown in the end elevational view of FIG. 5B. Outer arrays "a" and "b" are then interlocked. If the large bale 32 is to be subsequently compressed to a smaller size, the strap can be severed in two places at indentation marks 42 and removed. The disposable segment portion of the primary strap segment 40 that is labeled "cd" in FIG. 5A can then be disposed of. The remainder of the primary strap segment 40, still interlocked at arrays "a" and "b," and comprising end strap segments "ac" and "db," can then be looped about the small bale 36 as shown in FIG. 5C. The severed ends of the primary strap segment 40 are then connected by joining arrays "c" and "d." The location of arrays "c" and "d," and the length of the portion of the strap segment 40 between them designated as "cd," are determined so that upon compression of the large bale 32 into the small bale 36, the position of arrays "c" and "d" with respect to each other will permit an overlapping interlocking sealless joint.

Another form of the combination strap segment invention is shown in FIGS. 6A, B, and C. Primary strap segment 44 is shown in FIG. 6A having an outer array of interlocking joint elements on each end designated as "e" and "f." A pair of interior arrays of joint elements "g" and "h" is shown located on primary strap segment 44 between outer arrays "e" and "f" and define the ends of a secondary or inner segment "gh." Arrays "e" and "f" are constructed to interlock with each other and arrays "g" and "h" are constructed to interlock with each other. In use, primary strap segment 44 is looped about large bale 32 as shown in FIG. 6B and its ends are connected by joining arrays "e" and "f" together. If the large bale 32 is to be subsequently compressed to a smaller physical size, the portion of the primary strap segment 44 designated "gh" in FIG. 6A is severed from primary strap segment 44 at indentation marks 46. The still interlocked portions of primary strap segment designated by "eg" and "hf" are removed and disposed of. The remaining portion the secondary or, inner segment "gh," is looped around the small bale 36, as shown in FIG. 6C, and joined together with arrays "g" and "h."

FIG. 7A shows another form of the invention. Here, primary strap segment 48 has outer arrays of joint elements on each end designated as "i" and "j," which are adapted for interlocking with each other. One inner array of joint elements designated "k" is located between the two outer arrays "i" and "j." The portion of primary strap segment 48 between arrays "i" and "k" is designated "ik" and the portion of primary strap segment 48 between arrays "k" and "j" is an end strap segment designated "jk." Array "k" is adapted for interlocking with array "j" to form a connection. In use, primary strap segment 48 is looped about a large bale 32, as shown in FIG. 7B. The strap segment is connected by joining arrays "i" and "j" together. If larger bale 32 is to be compressed to a smaller physical size, primary strap segment 48 is severed at indentation mark 50 or indicia aperture 51 and removed. If the connection formed by arrays "i" and "j" is of the type that can be disengaged, then a portion of the primary strap segment 48 can be reused to band the small bale 36 as shown in FIG. 6. This is accomplished by disengaging the primary strap segment 48 end connection at arrays "i" and "j" and disposing of segment "ik." The remaining secondary or end strap segment designated "jk" can be looped about small bale 36 and the ends of that portion can be connected by joining arrays "k" and "j." More than one inner array can be used to provide a choice of different lengths of severed strap segments if desired.

Still another embodiment of the invention is shown in FIG. 8A. Primary strap segment 52 is shown in plan view with an outer joint array "l" on the left end and an outer joint array "m" on the right end. Four additional joint arrays are shown on primary strap 52. A pair of interior arrays "p" and "q" are shown on the innermost portion of primary strap segment 52 defining a secondary or inner strap segment. A pair of intermediate arrays "n" and "o" are shown positioned outside of the interior arrays "p" and "q." Intermediate array "n" is located adjacent to interior array "p," between interior array "p" and outer array "l." Intermediate array "o" is located adjacent to interior array "q," between interior array "q" and outer array "m." Outer arrays "l" and "m" are constructed to interlock with each other to form a connection joint. Intermediate arrays "n" and "o" are constructed to interlock with each other and form a connection joint. Similarly, interior arrays "p" and "q" are constructed to interlock with each other and form a connection joint. In use, primary strap segment 52 is looped about a large bale 32 and its ends are connected by joining outer arrays "l" and "n" together. If the large bale 32 is to be subsequently compressed to a smaller physical shape, then primary strap segment 52 is severed in two places at indentation marks 54 and 50 removed. Two smaller portions of the primary strap segment 52 have been created, one such portion, secondary or end segments "ln" and "om," still being interlocked at outer arrays "l" and "m" and the other portion being the secondary or inner strap segment bounded by arrays "p" and "q." The severed portions formed thereby can both be used to band the small bale 36 as shown in FIGS. 8C and 8D. The end strap segment part of the interlocked portion of the strap designated "ln" in FIG. 8A is looped about one half of the small bale 36 and the end strap segment part designated "om" in FIG. 8A is looped about the remaining half of the small bale 36 as shown in FIG. 8C, so that the ends of portions "om" and "ln" overlap. The ends can then be connected by interlocking intermediate arrays "n" and "o" together. In FIG. 8D, small bale 36 is shown with the other portion of primary strap segment 52 looped about it. This other portion consists of the portion of the segment designated "pq" in FIG. 8A and the ends are connected by interlocking arrays "p" and "q" together. The two portions formed from the doubly severed primary strap segment 52 can be used to band the same small bale or two different small bales.

In the various embodiments of the invention shown on the primary strap segments in FIGS. 5A, 6A, 7A, and 8A, the spacing and location of the intermediate arrays and inner arrays is determined from the size of the larger bale and the size of the resulting smaller bale.

The use of the primary strap segment having integral smaller strap segments with sealless connection ends is not restricted to strapping of bales of compressible material that are subsequently reduced in size to smaller, high-density bales. After a large package or material has been banded with one of the primary strap segments and the primary strap segments are subsequently removed by severing the segment in one or more places, the resulting smaller strap segment can be used to band other packages or other materials of smaller size. The size of such other smaller material or packages would be predetermined and the spacing of the interior and/or intermediate arrays on the strap segments would be correspondingly designed to provide the smaller strap segment portions of suitable length.

In addition, a larger strap segment could be made by combining a number of the smaller severed portions of the primary strap segment. The larger segment could thus be used on larger packages or material. Any of the embodiments of the primary strap segment (40, 44, 46, or 52) shown in FIGS. 5A, 6A, 7A, and 8A can be used in various ways by being joined (before or after severance) to other strap segments.

For example, two primary strap segments 52 (FIG. 8A) could be joined together to form a loop twice as large as a loop formed from one strap segment 52. Specifically, assume that a first and second primary strap segment each has arrays designated with the subscript 1 and 2, respectively. Then, the first primary strap segment has outer arrays "$l_1$" and "$m_1$" and the second primary strap segment has outer arrays "$l_2$" and "$m_2$". The two primary strap segments could be first joined together by interlocking arrays "$m_1$" and "$l_2$" and a larger connected loop could then be finally formed by interlocking arrays "$l_1$" and "$m_2$". Similar results can be achieved with a plurality of primary strap segments which have each been severed in one or more places. To illustrate this, again assume that a first and second primary strap segment each has arrays designated with the subscript 1 and 2, respectively. The various arrays on each primary strap segment can be adapted to interlock with each other in additional joint combinations not illustrated in FIGS. 8B, 8C, and 8D. For example, on the first primary strap segment, interior array "$q_1$" can be adapted to interlock with outer array "$l_1$" and intermediate array "$o_1$" can be adapted to interlock with outer array "$m_1$". Similarly, on the second primary strap segment, interior array "$q_2$" can be adapted to interlock with outer array "$l_2$" and intermediate array "$o_2$" can be adapted to interlock with outer array "$m_2$". Note that since both primary strap segments are identical, it follows that array "$q_1$" and array "$l_2$" are also adapted to be interlocked together, as are arrays "$q_2$" and "$l_1$," "$o_1$" and "$m_2$"; and "$o_2$" and "$m_1$". Then, the first and second primary strap segments can each be severed between arrays "$q_1$" and "$o_1$" and between arrays "$q_2$" and "$o_2$", respectively. The resulting segments "$o_1 m_1$" and "$o_2 m_2$" could then be joined end-toend to form a loop by interlocking array "$o_2$" with array "$m_1$" and array "$o_1$" with array "$m_2$". Similarly, other segments "$l_1q_1$" and "$l_2q_2$" could be joined end-to-end by interlocking array "$l_2$" with array "$q_1$" and array "$l_1$" with array "$q_2$" to form a loop larger than that formed from just one primary strap segment. Obviously, a variety of end-to-end combinations of different strap segments from a multiple of primary strap segments is available. This variety increases with increasing numbers of interior or intermediate joint element arrays on each primary strap segment.

The indentation marks 42, 46, 50, and 54 shown in FIGS. 5A, 5B, 6A, 6B, 7A, 7B, 8A, and 8B were for convenience shown as a concave indentation in the strap. The mark for indicating where a primary strap segment is to be severed can be of any suitable kind. For instance, a scribed line on the strap surface or a painted line on the strap surface could be used. Also, to promote easier severing, one or more small perforations or holes such as indicia aperture 51 in FIG. 7A could be located in and across the strap at the point of severance (with or without other indicia). Of course, no separate indicia need be used at all, since a region of severance is inherently defined adjacent the array(s) defining the secondary strap segment and just beyond, or exterior of, the secondary strap segment.

It can be seen that the invention described herein permits the use of a primary strap segment about a package or bale of material wherein, subsequent to the removal of the strap segment, the need for scrapping some or all of the strap is precluded by providing a method wherein portions of the strap can be reused. The method of reuse, utilizing, as it can, a sealless connection joint, does not require additional tools or additional separate joint seals or buckles.

The foregoing description and the drawings are intended to be illustrative and are not to be taken as limiting. Still other variations and/or rearrangements of parts within the spirit and scope of the present invention are possible and will readily present themselves to the skilled artisan.

What is claimed is:

1. A one piece strap segment comprising (a) a primary strap segment adapted to define a first loop about material and adapted to be coupled by a first sealless strap connection of predetermined strength between overlapped strap ends of the primary strap segment and (b) an inner strap segment of predetermined length contained within said primary strap segment and adapted to define a second, smaller loop about material and adapted to be coupled by a second sealless strap connection of predetermined strength between overlapped strap ends of the inner strap segment, said primary strap segment having on each end thereof an outer array of a limited predetermined number of longitudinally spaced shear lock joint elements, the joint elements of one of said outer arrays being adapted to interlock with the joint elements of the other outer array, said inner strap segment including and defined by a pair of interior arrays of a limited predetermined number of longitudinally spaced shear lock joint elements, the joint elements of one of said interior arrays being adapted to interlock with the joint elements of the other interior array, said interior arrays being positioned between said outer arrays and defining between them the major portion of said inner strap segment, said interior arrays further defining a strap severance region adjacent each interior array exterior of said inner strap segment, said major portion of the inner strap segment being constructed of continuous, solid strap whereby (a) said inner strap segment can be severed at each end from said primary strap segment in said severance regions for forming said second loop and for being coupled by said second sealless strap connection of predetermined strength which is properly made by the interlocking of all said limited predetermined number of interior array joint elements between overlapped ends of the inner strap segment, said properly made second sealless connection being readily ascertainable upon visual inspection of said interior array joint elements, (b) the major portion of the inner strap segment presents surfaces free of snagging apertures, and (c) the major portion of the inner strap segment is free of joint element stress concentration discontinuities which can serve as propagation points of structural failure under applied loading.

2. The one piece strap segment in accordance with claim 1 in which the portions of the primary strap segment between the outer and interior arrays are constructed of continuous, solid strap whereby (a) said first sealless strap connection of predetermined strength is properly made by the interlocking of all said limited predetermined number of outer array joint elements between overlapped ends of the primary strap segment, said properly made first sealless connection being readily ascertainable upon visual inspection of said outer array joint elements, and (b) the portions of the primary strap segment between the outer and interior arrays present surfaces free of snagging apertures and free of joint element stress concentration discontinuities which can serve as propagation points of structural failure under applied tension loading.

3. The one piece strap segment in accordance with claim 1 in which said major portion of said inner strap segment has a uniform cross-sectional area throughout its length in any plane perpendicular to its length whereby said major portion presents snag-free surfaces and edges and is subject to stress independent of length when a tension load is applied.

4. The one piece strap segment in accordance with claim 1 further including strap severance indicia on each end of said primary strap segment between one of said outer arrays of joint elements and one of said interior arrays of joint elements.

5. The one piece strap segment in accordance with claim 4 in which said indicia include at least one aperture in said primary strap segment.

6. A one piece strap segment comprising (a) a primary strap segment adapted to define a first loop about material and adapted to be coupled by a first sealless strap connection of predetermined strength between overlapped strap ends of the primary strap segment, (b) an inner strap segment of predetermined length contained within said primary strap segment and adapted to define a second, smaller loop about material and adapted to be coupled by a second sealless strap connection of predetermined strength between overlapped strap ends of the inner strap segment, and (c) two end strap segments of predetermined length contained within said primary strap segment and adapted to form a third loop and be coupled by a third sealless strap connection of predetermined strength between overlapped strap ends of the end strap segments, said primary strap segment having on each end thereof an outer array of a limited predetermined number of longitudinally spaced shear lock joint elements, the joint elements of one of said outer arrays being adapted to interlock with the joint elements of the other outer array, said inner strap segment including and defined by a pair of interior arrays of a limited predetermined number of longitudinally spaced shear lock joint elements, the joint elements of one of said interior arrays being adapted to interlock with the joint elements of the other interior array, said interior arrays being positioned between said outer arrays and defining between them the major portion of said inner strap segment, said interior arrays further defining a first pair of strap severance regions adjacent each interior array exterior of said inner strap segment, said major portion of the inner strap segment being constructed of continuous, solid strap, each of said end strap segments having on one end thereof an intermediate array of a limited predetermined number of longitudinally spaced shear lock joint elements, the joint elements of one of said intermediate arrays being adapted to interlock with the joint elements of the other intermediate array, each of said intermediate arrays being on opposite ends of said primary strap segment between one of said outer arrays and one of said interior arrays; said end strap segments each including and defined by one of said outer arrays and one of said intermediate arrays, the portion of each said end strap segment between an outer and intermediate array being a major portion of each said end strap segment and being constructed of continuous, solid strap throughout, said intermediate arrays further defining a second pair of strap severance regions adjacent each intermediate array exterior of said end strap segments, whereby (a) said inner strap segment can be severed at each end from said primary strap segment in said first pair of severance regions for forming said second loop and for being coupled by said second sealless strap connection of predetermined strength which is properly made by the interlocking of all said limited predetermined number of interior array joint elements between overlapped ends of the inner strap segment, said properly made second sealless connection being readily ascertainable upon visual inspection of said interior array joint elements, (b) the major portion of the inner strap segment presents surfaces free of snagging apertures, and (c) the major portion of the inner strap segment is free of joint element stress concentration discontinuities which can serve as propagation points of structural failure under applied loading and whereby (a) each said end strap segment can be severed from said primary strap segment in said second pair of severance regions for forming said third loop from said two end strap segments which is smaller than said first loop and for being coupled by said first sealless strap connection and by said third sealless strap connection of predetermined strength which is properly made by the interlocking of all said limited predetermined number of intermediate array joint elements between overlapped ends of said end strap segments, said properly made third sealless connection being readily ascertainable upon visual inspection of said intermediate array joint elements, (b) the major portions of the two end strap segments present surfaces free of snagging apertures, and (c) the major portions of the two end strap segments are free of joint element stress concentration discontinuities which can serve as propagation points of structural failure under applied tension loading.

7. A one piece strap segment comprising (a) a primary strap segment adapted to define a first loop about material and adapted to be coupled by a first sealless strap connection between overlapped strap ends of the primary strap segment; (b) an inner strap segment of predetermined length contained within said primary strap segment and adapted to define a second, smaller loop about material and adapted to be coupled by a second sealless strap connection between overlapped strap ends of the inner strap segment; and (c) a pair of strap severance indicia spaced apart on said primary strap segment on either end of said inner strap segment; said primary strap segment having on each end thereof and spaced outwardly of said pair of severance indicia an outer array of a limited predetermined number of longitudinally spaced shear lock joint elements, the joint elements of one of said outer arrays being adapted to interlock with the joint elements of the other outer array; said inner strap segment including and defined by a pair of interior arrays of a limited predetermined number of longitudinally spaced shear lock joint elements, the joint elements of one of said interior arrays being adapted to interlock with the joint elements of the other interior array; said interior arrays being positioned between said severance indicia and defining between them the major portion of said inner strap segment, said major portion of the inner strap segment being constructed of continuous, solid strap whereby (a) said inner strap segment can be severed at each end from said primary strap segment at said strap severance indicia for forming said second loop and for being coupled by said second sealless strap connection which is properly made by the interlocking of all said limited predetermined number of interior array joint elements between overlapped ends of the inner strap segment, said properly made second sealless connection being readily ascertainable upon visual inspection of said interior array joint elements, (b) the major portion of the inner strap segment presents surfaces free of snagging apertures, and (c) the major portion of the inner strap segment is free of joint element stress concentration discontinuities which can serve as propagation points of structural failure under applied loading.

8. A one piece strap segment comprising (a) a primary strap segment adapted to define a first loop about material to be tied and be coupled by a first sealless strap connection of predetermined strength between overlapped strap ends of the primary segment, (b) a disposable inner strap segment of predetermined length contained within the primary strap segment, and (c) two end strap segments contained within the primary strap segment; said end strap segments being adapted to from a second loop and be coupled by a second sealless strap connection of predetermined strength between overlapped ends of the end strap segments; said primary strap segment having on each end thereof an outer array of a limited predetermined number of longitudinally spaced shear lock joint elements, the joint elements of one of said outer arrays being adapted to interlock with the joint elements of the other outer array; said primary strap segment further having a pair of interior arrays of a limited predetermined number of joint elements spaced inwardly of and between the outer arrays, the joint elements of one of the interior arrays being adapted to interlock with the joint elements of the other interior array; the portion of each said end strap segment between an outer and interior array being a major portion of each said end strap segment being constructed of continuous, solid strap throughout; said disposable inner strap segment lying between said pair of interior arrays and said interior arrays defining a strap severance region adjacent each interior array on each end of said disposable inner strap segment whereby (a) said disposable inner strap segment can be severed at each end from said primary strap segment in said severance regions thus leaving said two end strap segments for forming a second loop which is smaller than said first loop and for being coupled by said first sealless strap connection wherein the joint elements of said outer arrays are interlocked together and by said second sealless strap connection of predetermined strength which is properly made by the interlocking of all said limited predetermined number of interior array joint elements between overlapped ends of said end strap segments, said properly made second sealless connection being readily ascertainable upon visual inspection of said interior array joint elements, (b) the major portions of the two end strap segments present surfaces free of snagging apertures, and (c) the major portions of the two end strap segments are free of joint element stress concentration discontinuities which can serve as propagation points of structural failure under applied tension loading.

9. The one piece strap segment in accordance with claim 8 in which said disposable inner strap segment lying between said pair of interior arrays is constructed of continuous, solid strap throughout.

10. A one piece strap segment comprising (a) a primary strap segment adapted to define a first loop about a material to be tied and adapted to be coupled by a first sealless strap connection of predetermined strength between overlapped strap ends of the primary strap segment and (b) an end strap segment of predetermined length contained within said primary strap segment and adapted to define a second, smaller loop about material to be tied and adapted to be coupled by a second sealless strap connection of predetermined strength between overlapped strap ends of the end segment, said primary strap segment having on a first end thereof a first outer array of a limited predetermined number of longitudinally spaced shear lock joint elements; said primary strap segment having on a second end thereof a second outer array of a limited predetermined number of longitudinally spaced shear lock joint elements, said end strap segment including and defined by said first outer array and a third, interior array of a limited predetermined number of longitudinally spaced shear lock joint elements; said interior array and said first outer array defining therebetween a major portion of said end strap segment, said major portion of the end strap segment and the portion of the primary strap segment between the second outer array and the interior array all being constructed of continuous, solid strap, said interior array further defining a strap severance region adjacent said interior array exterior of said end strap segment, said joint elements of said first outer array being adapted to interlock with the joint elements of said second outer array and further being adapted to interlock with the joint elements of said interior array whereby (a) said end strap segment can be severed from said primary strap segment between said interior array and said second outer array in said severance region for forming said second loop which is smaller than said first loop and for being coupled by said second sealless strap connection of predetermined strength which is properly made by the interlocking of all said limited predetermined number of first outer array and interior array joint elements between overlapped ends of said end strap segment, said properly made second sealless connection being readily ascertainable upon visual inspection of said first outer and interior array joint elements, (b) the major portion of said end strap segment presents surfaces free of snagging apertures, and (c) the major portion of said end strap segment is free of joint element stress concentration discontinuities which can serve as propagation points of structural failure under applied tension loading.

11. A one piece strap segment comprising (a) a primary strap segment adapted to define a first loop about a material to be tied and to be adapted to be coupled by a first sealless strap connection of predetermined strength between overlapped strap ends of the primary strap segment and (b) at least one secondary strap segment contained within said primary strap segment and adapted to be severed from said primary strap segment for forming a loop by one of (a) defining alone a complete, second loop about a material to be tied and being coupled by a second sealless strap connection of predetermined strength between overlapped strap ends of the secondary strap segment, and (b) being coupled with another similar secondary strap segment by a third sealless strap connection of predetermined strength between a first pair of overlapped ends of both secondary strap segments to define a third loop for being coupled by a fourth sealless strap connection of a predetermined strength between a second pair of overlapped ends of both secondary strap segments;

said primary strap segment having on each end thereof an outer array of a limited predetermined number of longitudinally spaced shear lock joint elements, the joint elements of one of said outer arrays being adapted to interlock with the joint elements of the other outer array;

said primary strap segment further having at least one interior array of a limited predetermined number of longitudinally spaced shear lock joint elements, said interior array spaced inwardly of and between said outer arrays;

said secondary segment including and being defined by two arrays of joint elements, at least one of the two arrays on said secondary strap segment being one of said interior arrays and the second of the two arrays on said secondary strap segment being one of (a) another interior array, and (b) one of said two outer arrays;

at least one of said interior arrays further defining a strap severance region adjacent said interior array exterior of said secondary strap segment, the portion on each said secondary strap segment between the two arrays defining the secondary strap segment being a major portion of the secondary strap segment and being constructed of continuous, solid strap throughout whereby (a) at least one said secondary strap segment can be severed from said primary strap segment in said severance region and whereby said second, third and fourth sealless strap connections of predetermined strength are properly made by the interlocking of all said limited predetermined number of joint elements in said secondary strap segment between overlapped ends of one of
(i) said secondary strap segment and
(ii) said similar secondsry strap segment,
said properly made sealless strap connnections being readily ascertainable upon visual inspection;
(c) the major portions of all said secondary strap segments present surfaces free of snagging apertures, and
(d) said major portion of all said secondary strap segments are free of joint element stress concentration discontinuities which can serve as propagation points of structural failure under applied tension loading.

* * * * *